(12) United States Patent
Gohle et al.

(10) Patent No.: US 8,120,773 B2
(45) Date of Patent: Feb. 21, 2012

(54) METHOD AND DEVICE FOR CAVITY ENHANCED OPTICAL VERNIER SPECTROSCOPY

(75) Inventors: Christoph Gohle, Munich (DE); Albert Schliesser, Munich (DE); Theodor W. Haensch, Munich (DE)

(73) Assignee: Max-Planck-Gesellshaft zur Foerderung der Wissenschaften, E.V., Munich (DE)

( * ) Notice: Subject to any disclaimer, the term of this patent is extended or adjusted under 35 U.S.C. 154(b) by 256 days.

(21) Appl. No.: 12/520,577

(22) PCT Filed: Dec. 19, 2007

(86) PCT No.: PCT/EP2007/011219
§ 371 (c)(1),
(2), (4) Date: Dec. 4, 2009

(87) PCT Pub. No.: WO2007/077572
PCT Pub. Date: Jul. 3, 2008

(65) Prior Publication Data
US 2010/0103413 A1   Apr. 29, 2010

(30) Foreign Application Priority Data
Dec. 22, 2006 (EP) .................... 06026763

(51) Int. Cl.
*G01J 3/28* (2006.01)
(52) U.S. Cl. .............. 356/326; 356/319; 356/328
(58) Field of Classification Search .............. 356/319, 356/326, 328
See application file for complete search history.

(56) References Cited

U.S. PATENT DOCUMENTS 4,791,633 A * 12/1988 Esherick et al. ........... 372/32
2002/0171835 A1 11/2002 Haensch et al.

OTHER PUBLICATIONS

Thorpe, Michael J., et al., "Broadband Cavity Ringdown Spectroscopy for Sensitive and Rapid Molecular Detection", Science American Assoc. for the Advancement of Science, Mar. 17, 2006, vol. 311, p. 1595-1599.
Schliesser, Albert, et al., "Complete Characterization of a Broadband High-Finesse Cavity Using an Optical Frequency Comb", Optics Express, Jun. 26, 2006, vol. 14, No. 13, p. 5975-5983.
Scherer, James J., et al., "Broadband Ringdown Spectral Photography", Applied Optics, Dec. 20, 2001, vol. 40, No. 36, p. 6725-6732.

(Continued)

*Primary Examiner* — Tarifur Chowdhury
*Assistant Examiner* — Abdullahi Nur
(74) *Attorney, Agent, or Firm* — Caesar, Rivise, Bernstein, Cohen & Pokotilow, Ltd.

(57) ABSTRACT

A spectroscopic analysis of a sample includes arranging the sample in a resonator cavity for transmitting cavity mode frequencies with a cavity mode frequency spacing, coupling pulsed source light into the resonator cavity, with the source light including source comb frequencies with a source frequency spacing, coupling pulsed transmitted light out of the resonator cavity, and spectrally resolved detecting the transmitted light with a detector device. The cavity mode frequency spacing and the source frequency spacing are detuned relative to each other, so that the transmitted light includes transmitted comb frequencies with a spacing larger than the source frequency spacing. The detecting feature includes collecting spectral distributions of the transmitted light in dependence on relative positions of the cavity mode frequencies and the source comb frequencies. The cavity mode frequencies and the source comb frequencies are varied relative to each other and different transmitted comb frequencies are individually resolved.

31 Claims, 3 Drawing Sheets

OTHER PUBLICATIONS

Reichert, J., et al., "Phase Coherent Vacuum-Ultraviolet to Radio Frequency Comparison with a Mode-Locked Laser", Physical Review Letters, Apr. 10, 2000, vol. 84, No. 15, p. 3232-3235.

Cundiff, Steven T., et al., Colloquium: Femtosecond Optical Frequency Combs, Review of Modern Physics, Jan. 2003, vol. 75, p. 325-342.

Diddams, S.A., et al., An Optical Clock Based on a Single Trapped 199Hg + Ion, Science, Aug. 3, 2001, vol. 293, p. 825-828 p.

Fischer, M., et al., "New Limits on the Drift of Fundamental Constants from Laboratory Measurements", Physical Review Letters, Jun. 11, 2004, vol. 92, No. 23, p. 230802(1)-230802(4).

Baltuska, A., et al., "Attosecond Control of Electronic Processes by Intense Light Fields", Nature, Feb. 6, 2003, vol. 42, p. 611-615.

Gherman, Titus, et al., "Mode-Locked Cavity-Enhanced Absorption Spectroscopy", Optics Express, Sep. 23, 2002, vol. 10, No. 19, p. 1033-1042.

Cerez, P., et al., "IEEE Transactions on Instrumentation and Measurement", Dec. 1980, vol. 29, p. 352 (abstract only).

Ma, L.S., et al., "IEEE Journal of Quantum Electronics", Nov. 1990, vol. 26, p. 2006 (abstract only).

Bucher, C.R., et al, "Doppler-free Nonlinear Absorption in Ethylene By Use of Continuous-Wave Cavity Ringdown Spectroscopy", Applied Optics, Jun. 20, 2008, vol. 39, No. 18, p. 3154-3164.

Rothman, L.S., et al., "The HITRAN 2004 Molecular Spectroscopic Database", Journal of Quantative Spectroscopy & Radiative Transfer, 2005, vol. 96, p. 139-204.

International Search Report for corresponding PCT Application No. PCT/EP2007/011219, dated Mar. 7, 2008.

* cited by examiner

METHOD AND DEVICE FOR CAVITY ENHANCED OPTICAL VERNIER SPECTROSCOPY

BACKGROUND OF THE INVENTION

The present invention is related to a method of broad band high resolution spectroscopic analysis of a sample and to a spectroscopic device being adapted for implementing the method.

The frequency spectrum of a periodic sequence of ultrashort light pulses consists of a regular arrangement of sharp lines (so-called frequency comb). Generally, the frequency width of the spectrum will be inversely proportional to the temporal width of the pulse envelope. Accordingly, a periodic sequence of femtosecond pulses is characterized by broadband frequency combs. The femtosecond frequency comb (see e.g. J. Reichert et al. in "Physical Review Letters" vol. 84, 2000, p. 3232, and S. T. Cundiff et al. in "Reviews of Moderns Physics" vol. 75, 2003, p. 325) has served as a universal optical clockwork mechanism (S. A. Diddams et al. in "Science" vol. 293, 2001, p. 825), has enabled new precision test of fundamental theories (M. Fischer et al. in "Physical Review Letters" vol. 92, 2004, 230802) and allows complete control of the electric field in ultra short pulses (A. Baltuska et al. in "Nature" vol. 421, 2003, p. 611). Furthermore, the combination of high peak power in femtosecond pulses and the high spectral quality of each of the lines of the frequency comb can be utilized to create narrow bandwidth sources for high resolution spectroscopy in, with that respect, previously inaccessible wavelength ranges.

As a particular application of high resolution spectroscopy, so-called broad band cavity enhanced absorption spectroscopy methods (CEAS methods) have been developed (see e.g. M. J. Thorpe et al. in "Science" vol. 311, 2006, p. 1595, and T. Gherman et al. in "Optics Express" vol. 10, 2002, p. 1033). A femtosecond pulse train generated with a mode-locked laser source is coupled into a resonator cavity including a sample to be investigated. The femtosecond pulse train and the resonator cavity are tuned such that cavity modes essentially correspond to the comb components of the femtosecond pulse train. Due to the large number of round trips of the frequency components matched to the cavity modes, the interaction of the sample with light is essentially increased. Intensity of light pulses transmitted by the resonator cavity is evaluated for obtaining a spectral absorption of the sample. The power throughput through the resonator cavity is dramatically increased as the coherent frequency comb is used as a laser source instead of an incoherent broadband source, so that the sensitivity of the broadband cavity enhanced absorption spectroscopy is essentially increased.

According to the technique of M. J. Thorpe et al., the transmitted light pulses through the resonator cavity are spectrally resolved and detected with a CCD sensor. For avoiding a source noise introduced into the transmitted pulses, a so-called ring down signal is measured after step-wise blocking the pulses coupled into the resonator cavity. For measuring the ring down signal, a scanning mirror is used for streaking the spectrally resolved light pulses to different portions of the sensitive area of the CCD sensor.

The conventional CEAS methods have a disadvantage as the resolution of these methods is limited by the spectrometer, recording the ring down signal and ignoring the high temporal coherence of the driving signal. In particular, with the conventional CEAS methods it is impossible to resolve the individual comb components of a light pulse train coupled into the resonator cavity. Resolving the comb components of a femtosecond pulse train would require a spectral disperser having an impractical dimension of about e.g. 30 cm for a repetition frequency of the pulse train of 1 GHz and associated optical components having essential drawbacks in terms of aberrations.

Combining high sensitivity of the conventional CEAS method of M. J. Thorpe et al. with high spectral resolution in an efficient and unambiguous manner proves challenging. Application of a further high resolution spectral disperser is excluded by the requirement of conventional detecting the ring-down signal with sufficient time resolution. Furthermore, for a reduction in transmission through a cavity to be interpreted as an additional loss inside the resonator, it is required that the frequency comb mode is always on resonance. This condition can in general only be achieved for two modes from a frequency comb as dispersion inside the resonator will render the frequency spacing of the modes in the resonator non-equidistant. Even if the resonator is engineered to have an equidistant mode spacing within the bandwidth of interest, adding an absorber (dielectric medium) into the resonator will make the resonant mode positions move in frequency. Therefore it is difficult to distinguish between a reduction in transmission due to dispersion or due to absorption. In the technique of T. Gherman et al. this ambiguity is resolved by dithering the resonator around the resonant frequency and measuring the time averaged transmission signal, effectively removing the dispersion effect from the result. A. Schliesser et al. ("Optics Express" vol. 14, 2006, p. 5975) have demonstrated a scheme which remedies this ambiguity, yielding both absorption and dispersion information. However, both of the latter techniques are not capable to detect the comb components with sufficient spectral resolution.

The objective of the invention is to provide an improved method of spectroscopic analysis of a sample avoiding the disadvantages of the conventional methods. Furthermore, the objective of the invention is to provide an improved spectroscopic device avoiding the disadvantages of the conventional devices.

SUMMARY OF THE INVENTION

These objectives are solved with methods and spectroscopic devices comprising the features of the independent claims. Advantageous embodiments and applications of the invention are defined in the dependent claims.

According to a first aspect of the invention, the above objective is solved by providing a cavity enhanced absorption spectroscopy method wherein due to a detuning of a source frequency spacing characteristic for a frequency comb of pulsed source light and a cavity mode frequency spacing characteristic for a mode comb of a resonator cavity, light pulses transmitted by the resonator cavity have an enlarged transmitted frequency spacing. With the enlarged transmitted frequency spacing, single frequency components of the pulsed light can be spectrally resolved. Advantageously, individual source comb components can be resolved so that the method of the invention can boost the resolution of the method from the limitation of usual spectral disperser techniques to the Hertz level that is provided e.g. by stabilized laser sources.

According to a second aspect of the invention, the above objective is solved by providing a spectroscopic device, being adapted in particular for cavity enhanced absorption analysis of a sample, wherein a pulse source device and a resonator cavity being arranged for providing the source frequency spacing and the cavity mode frequency spacing detuned relative to each other, so that the transmitted light comprises a transmitted frequency spacing larger than the source frequency spacing. In particular, the spectroscopic device is configured for implementing the method according to the above first aspect. Advantageously, the invention provides a simple yet powerful device that yields broad band high resolution spectra for both absorption and dispersion of a sample placed between mirrors of the resonator cavity.

An essential feature of the invention is the detuning of the source frequency spacing and the cavity mode frequency spacing, which results in a transmission of certain source frequencies through the resonator cavity only. A detuning ratio of both frequency spacings determines, which of the cavity mode frequencies are matched to source frequencies. Accordingly, the detuning ratio determines the source frequencies exclusively transmitted by the resonator cavity. Detuning of the frequency spacings results in a suppression of transmitted light corresponding to a large number of cavity mode frequencies. The transmitted light is represented by a frequency comb having a transmitted frequency spacing, which is enlarged compared with the source frequency spacing in a predetermined manner. Accordingly, detuning of the frequency spacings results in a frequency filtering effect of the resonator cavity. Transmitted light having transmitted comb frequencies (resonant cavity mode frequencies with enlarged transmitted frequency spacing) can be detected with spectral resolution using a spectral disperser, wherein any unintended contributions of other source frequencies is avoided. In particular, individual comb frequencies of the transmitted light can be detected and resolved in first order diffraction of the spectral disperser or with refraction using a dispersive prism.

According to the invention, pulsed source light is coupled into the resonator cavity. The term "source light" generally refers to a sequence of light pulses having a pulse duration lower than 5 ps, preferably lower than 100 fs. In frequency space, the source light is represented by a frequency comb, which comprises a plurality of frequency components. The frequency components of the source light are called "source comb frequencies". The term "source frequency spacing" refers to the difference between adjacent source comb frequencies. The pulse source device for generating the source light is selected in dependence on the spectral range to be investigated. Preferably, the light pulses are generated with a mode-locked laser oscillator and/or a pulse source being operated on the basis of difference frequency generation or generation of higher harmonics.

The term "resonator cavity" generally refers to an arrangement of at least two resonator mirrors spanning an optical path with a predetermined cavity length. The resonator cavity is a high finesse resonator having a finesse (ratio of resonator cavity spacing to resonance width) of at least 100 (for providing m=30 in a detuning ratio r=m/n, see below), preferably at least 1000. The resonator mirrors comprise plane or spherical mirrors. Further optical components can be included in the resonator cavity. The resonant frequencies of the resonator cavity are called "cavity mode frequencies". The term "cavity mode frequency spacing" refers to the difference between adjacent cavity mode frequencies.

According to the invention, the sample is arranged in the resonator cavity. The optical path in the resonator cavity passes through the sample. The term "sample" generally refers to any gaseous, liquid or solid substance being capable to be arranged between mirrors of the resonator cavity and allowing multiple reflections of light within the cavity. To this end, the maximum absorption (per roundtrip) of the sample is preferably lower than 1%.

The term "transmitted light" generally refers to the light pulses coupled out of the resonator cavity. The transmitted light is represented by a frequency comb with the enlarged transmitted frequency spacing. Each transmitted light comb represents a group of transmitted comb frequencies. Changing the relative positions of the source comb frequencies and the cavity mode frequencies yields different transmitted comb frequencies. Groups of different transmitted comb frequencies yield characteristic spectral distributions, which are collected with the detector device.

The inventors have found that the absolute values of the transmitted comb frequencies can be selected in dependence on relative positions of the source comb frequencies and the cavity mode frequencies. Advantageously, the transmitted source comb modes can be identified allowing an absolute frequency calibration of the spectrally resolved detection. The term "relative positions of source comb frequencies and cavity mode frequencies" generally refers to the frequency differences between each source comb frequency and the closest cavity mode frequency. The transmitted light pulses can be detected by collecting the spectral distributions of the transmitted light in dependence on the relative positions of the cavity mode frequencies and the source comb frequencies. The source comb frequencies and the cavity mode frequencies can be adjusted relative to each other without essentially changing the detuning ratio of the above frequency spacings. Accordingly, the transmitted comb frequencies can be selected while the transmitted frequency spacing is kept essentially constant. Collecting the spectral distributions of the transmitted light in dependence on relative positions of the source comb frequencies and cavity mode frequencies allows a reliable selection of transmitted comb frequencies to be detected.

According to the invention, the transmitted comb frequencies are varied within a predetermined spectral range of interest by changing the source comb frequencies and/or the cavity mode frequencies. Advantageously, this frequency change allows a measurement of a spectral structure of the sample with high spectral resolution. The transmitted comb frequencies can be scanned through the spectral structure. According to this preferred embodiment of the invention, the transmitted comb frequencies are individually resolved by collecting the spectral distributions of the transmitted light while the source comb frequencies and/or cavity mode frequencies are changed. Collecting the spectral distributions of transmitted comb frequencies in particular includes separated detection of specific transmitted comb frequencies which correspond to neighbouring source comb frequencies which could not be spectrally resolved (separated) with the disperser device.

Advantageously, various types of collecting spectral distributions of the transmitted light can be implemented. The particular detecting step can be adapted in dependence on measurement conditions, like e.g. stability of the sample, availability of measurement time, amount of data to be processed etc.

If according to a first variant, the spectral distributions are collected consecutively in time, advantages in terms of a simple structure of the optical set-up can be obtained. If, according to a second variant, the spectral distributions are collected by separating the transmitted frequencies in time and space high-speed detector and acquisition electronics are advantageously not required. Furthermore, this variant has an essential advantage as direct and massively parallel access to the individual modes of a broad band frequency comb renders molecular absorption measurements a rapid and routine task while simultaneously pushing the resolution and calibration accuracy of such broad band spectrometers down to laser line width. A multi channel detection can be implemented with comb mode resolution. According to both variants, the steps of changing the source comb frequencies and/or cavity mode frequencies and detecting the associated spectral distribution of transmitted light can be repeated, in particular for improving the signal to noise ratio of the detector device output.

With separating the transmitted comb frequencies in time, preferably a step-wise procedure is implemented wherein firstly a predetermined relative position of the source comb frequencies and cavity mode frequencies is adjusted and secondly the spectral distribution of the transmitted light corresponding to the current relative position is detected. Subsequently, a further relative position of the source comb frequencies and cavity mode frequencies is adjusted and the associated spectral distribution of the transmitted light is detected. These steps are repeated until the detected transmitted comb frequencies have been varied through the spectral range of interest, e.g. through a certain spectral structure of the sample.

Alternatively, the relative position of the cavity mode frequencies and the source comb frequencies can be continuously varied while the spectral distributions of the transmitted source comb frequencies are recorded as a function of time. With this embodiment, advantages in terms of a short measurement time can be obtained.

With the additional separation of the transmitted comb frequencies in space, the transmitted light is deflected such that different transmitted comb frequencies are directed along different propagation directions to the detector device. Preferably, adjustment of relative positions of the source comb frequencies and cavity mode frequencies comprises continuously frequency shifting at least one of these frequencies such that the transmitted comb frequencies are varied through the whole spectral range of interest. During the frequency shifting, the associated spectral distributions of transmitted light are detected.

If the steps of changing the source comb frequencies and/or cavity mode frequencies and detecting the associated spectral distribution of transmitted light are to be repeated, the adjustment of the relative frequency positions preferably comprises a periodical frequency shifting. In this case, the deflecting and detecting steps are synchronized with the frequency shifting.

For detecting the separated transmitted light, various setups can be implemented. Firstly, the detector device can comprise one single detector which is arranged and moved for detecting the spectral distribution to be collected. Furthermore, the detector device can comprise a group of single detectors each of which being arranged for detecting a predetermined portion of the spectral distribution to be collected. Combinations of single detectors can be used for collecting spectral distributions according to different propagations directions of the transmitted light. According to a preferred embodiment, the detector device comprises one single sensitive area, wherein the different transmitted comb frequencies are detected at different portions of this sensitive area. Particularly preferred is the use of a two-dimensional CCD sensor being arranged for detecting the transmitted light.

Another advantage of the invention is given by the variability in adjusting the relative position of the source comb frequencies and cavity mode frequencies. Depending on the particular application conditions, varying an optical path length of the pulses source device and/or the resonator cavity or varying an injection intensity of the pulse source device are preferred techniques for frequency adjustment. Advantageously, these techniques are known in the prior art for controlling optical set-ups generating ultra short light pulses. Varying the optical path length can comprise e.g. an introduction of a dispersive material into the optical path of the pulse source device and/or the resonator cavity. However, according to particularly preferred embodiment of the invention, the optical path length is varied by changing a resonator length of the pulse source device or the cavity length of the resonator cavity.

According to a further advantageous embodiment of the invention, the spectroscopy method includes a step of detuning the source comb spacing and the cavity mode spacing. Preferably, the detuning step includes setting at least one of both spacings by adjusting the optical path of the pulse source device and/or the resonator cavity. Accordingly, the same technique can be used as for changing the source comb frequencies and the cavity mode frequencies.

Preferably, the detuning step includes setting a detuning ratio, which is selected in dependence on particular application conditions of the invention, in particular in dependence on a spectral resolution of the resonator cavity, the spectral disperser device and/or the detector device. The detuning ratio $r=m/n$ (m, n natural numbers with no common factors, i.e. greatest common divisor $GCD(m, n)=1$, $m \neq n$) defines that m source comb spacings equal n cavity modes spacings or, with other words, m source frequencies span an interval of n cavity mode frequencies.

In practice, the detuning ratio is not well defined, as the resonant cavity mode spacing in general depends on optical frequency. However, the inventors have found, that it is not important for the method to work, to set a precise and absolutely fixed detuning ratio. The detuning will work as long as the nominator of the cancelled fraction is sufficiently large. The values m, n are selected as follows. The nominator value m is selected with $m_{min} \leq m \leq m_{max}$, wherein the lower limit $m_{min}$ is selected such that the transmitted frequency spacing is large enough for spectrally resolved detection of the transmitted mode frequencies, and the upper limit $m_{max}$ is selected such that two neighbouring modes are not transmitted simultaneously by the resonator cavity. Accordingly, $m_{min}$ depends on the spectral resolution of the spectral disperser device, while $m_{max}$ depends on the spectral resolution, i.e. finesse, of the resonator cavity. The value n is preferably selected with $n=m\pm 1$. Accordingly, the detuning ratio r is about 1 (but not equal 1), so that the transmitted frequency spacing is increased in advantageous manner. Preferably, the value m is selected with $m>10$, particularly preferred $m>50$, like $m=100$ or even larger.

With the detector device, transmitted light with transmitted mode frequencies is detected with spectral resolution. The term "detecting light" generally refers to sensing the intensity of the transmitted light, including sensing absolute or relative intensities (possibly combined with a calibration measurement). As a quantitative measure of the sensed intensity, the detector device provides detector signals. Due to the separated collection of spectral distributions of different transmitted mode frequencies, the detector signals are generated with a format, which does not correspond to the usual frequency (or wavelength) axis of spectroscopy measurements. Accordingly, with a preferred embodiment of the invention, the spectroscopic measurement includes a step of resorting the detector signals into an order of a frequency (or wavelength) axis. The resorted detector signals represent an output signal of the detector device, which facilitates the further evaluation of the measurement. Preferably, the evaluation of the output signal includes the extraction of at least one spectroscopic parameter of the sample. As a particular advantage of the invention, both the dispersion and absorption spectra of the sample can be extracted from the output signal of the detector device.

Preferred applications of the invention can be found in linear absorption spectroscopy, and/or sub-Doppler non-linear spectroscopy, including e.g. saturation spectroscopy, optical pumping spectroscopy and multi-photon spectroscopy. The potentially high resolution makes the inventive technique suitable for cavity enhanced nonlinear Doppler free spectroscopy (see P. Cerez et al. in "IEEE TRANSACTIONS ON INSTRUMENTATION AND MEASUREMENT" vol. 29, 1980, p. 352; L. S. Ma et al. in "IEEE JOURNAL OF QUANTUM ELECTRONICS" vol. 26, 1990, p. 2006; and C. R. Bucher et al. in "Appl. Opt." vol. 39, 2000, p. 3154). Observing a lamb dip should be easy in a linear resonator transmission signal. In a ring resonator topology, one could perform usual saturation spectroscopy schemes with the saturation beam propagating in one and the probe beam in the other direction.

An important advantage of the invention is given by the fact that a simple method provides comb line resolution over a band width of more than 4 THz. Simultaneously the sensitivity is less than $10^{-6}/cm\sqrt{Hz}$ which was achieved in an interaction length of 29 cm only using a moderately high finesse optical resonator. This compares well to the results achieved by T. Gherman et al. in "Optics Express" vol. 10, 2002, p. 1033. The method is essentially equivalent to a ring down method and therefore robust against power fluctuations. In addition to ring down methods it also provides dispersion information with a potential accuracy equivalent or exceeding the one presented by A. Schliesser et al. ("Optics Express" vol. 14, 2006, p. 5975).

Advantageously, the method of the invention is very fast. A single acquisition takes only about 10 ms giving 4000 data points (4 THz with a resolution of 1 GHz). With little optimization, one can easily obtain 10 to 20 thousand spots on a mega pixel CCD (the only requirement being that the spots are well separated). The resolution of the scheme is essentially unlimited (Hz level, due to potential laser line width). And it can, at any time, be referenced easily to a primary frequency standard, giving a frequency reproducibility and accuracy of $10^{-15}$ (sub-Hz level).

BRIEF DESCRIPTION OF SEVERAL VIEWS OF THE DRAWINGS

Further details and advantages of the invention are described in the following with reference to the attached drawings. The drawings show in.

DETAILED DESCRIPTION OF PREFERRED EMBODIMENTS

Figure 1:
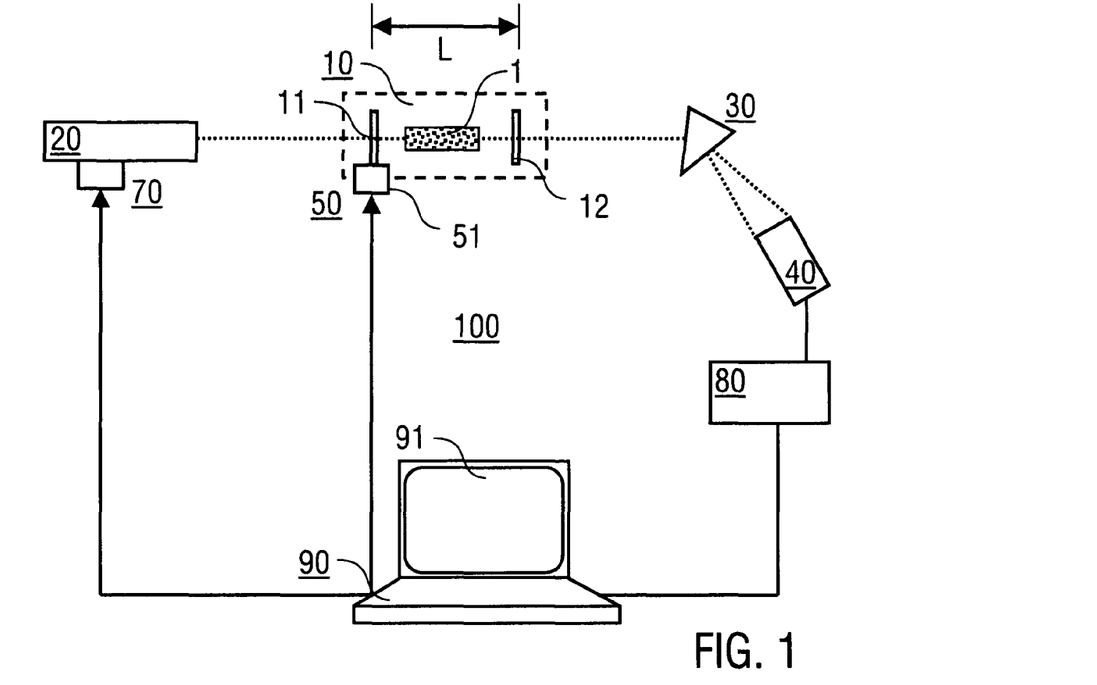
FIG. 1: a first embodiment of the invention including a separation of transmitted mode frequencies in time.
Figure 2:
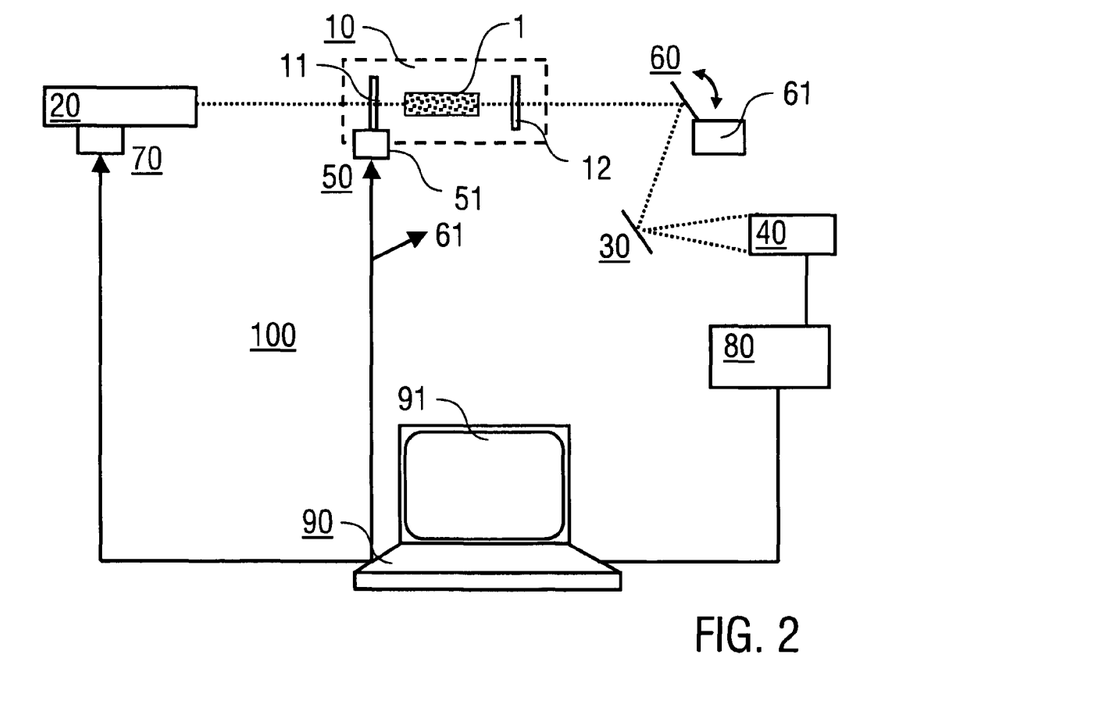
FIG. 2: a second embodiment of the invention including a separation of transmitted mode frequencies in space.

Preferred embodiments of the invention are illustrated in FIGS. 1 and 2. It is emphasized that these Figures represent schematic illustrations only. Details of the optical set-up, like e.g. controlling, driving or monitoring components or further optical parts are not described as far as they are known from prior art techniques of generating and handling ultra-short light pulses.

According to FIG. 1, the spectroscopic device 100 of the invention comprises a resonator cavity 10, a pulse source device 20, a spectral disperser device 30, a detector device 40, an adjusting device 50, a detuning device 70, an evaluation device 80 and a control device 90. The resonator cavity 10 comprises e.g. four mirrors in a bowtie ring cavity design, wherein only two mirrors 11, 12 are shown in FIG. 1. The mirrors 11, 12 are plane mirrors having a nominal transmission of 0.1% corresponding to a resonator finesse of $1000\pi$ (assuming negligible loss otherwise). The sample 1 comprises e.g. a gas in cuvette. The cuvette windows are arranged with the Brewster angle within the optical pulse of the resonator cavity 10. The resonator cavity 10 has a cavity length L, which is the length of the optical path along one round-trip in the resonator cavity. The cavity length is e.g. 29 cm. The mirrors 11, 12 comprise e.g. broadband dielectric quarter wave stack mirrors, centred at 792 nm.

The pulse source device 20 comprises a Ti:sapphire laser (type: Gigajet 20, manufacturer: Gigaoptics). The laser oscillator is operated with mode-locking or generating ultra-short light pulses (femtosecond light pulses) with a repetition frequency of 1 GHz, a bandwidth of about 12 THz FWHM and an average output power of about 0.5 W. The pulses are centered at 785 nm. The pulse source device 20 is arranged for directing the ultra-short light pulses into the resonator cavity 10, with appropriate imaging optics to match the mode profile of the laser beam to the resonant cavity mode.

The spectral disperser device 30 is arranged for spectrally resolving transmitted light coupled out of the resonator cavity 10. The spectrally resolved transmitted light is directed to the detector device 40. The spectral disperser device 30 comprises e.g. a disperser grating, a disperser prism or a spectrometer adapted for Fourier transform spectrometry, in particular a scanning Michelson interferometer. As an example, the spectral disperser device 30 comprises a spectrometer with Cherny-Turner design with a 2100/mm holographic grating with 10 mm aperture and having a 150 mm focal length. The aperture is fully used to match the point spread function of the spectral disperser device 30 to the pixel size of the detector device 40.

The detector device 40 comprises at least one light-sensitive detector, which is arranged for collecting the spectrally resolved light distribution of the transmitted light pulses. As an example, the detector device 40 may comprise one single detector (e.g. a photodiode), which is movable along the spectral distribution provided by the spectral disperser device 30. Preferably, the detector device 40 comprises a plurality of detectors arranged along the spectral distribution of the transmitted light. Particularly preferred is a CCD-sensor wherein single pixels or groups of pixels represent detectors for collecting the frequency components of the transmitted light. As an example, a CCD line or a CCD camera with a pixel size of 5 μm can be included in the detector device 40.

At least one of the mirrors 11, 12 of the resonator cavity 10 is mounted on the adjusting device 50, which comprises e.g. a piezo-electric transducer tube 51. The adjusting device 50 is arranged for scanning the resonator length L within a range of e.g. 3 μm.

The detuning device 70 is provided with the pulse source device 20. The detuning device 70 is arranged for setting the repetition frequency of the light pulses generated by the pulse source device 20. As an example, the detuning device 70 comprises a piezo-electric drive connected with one of the oscillator mirrors of the Ti-sapphire laser. Alternatively, a stepping motor or a translation stage with micrometer screw can be used. According to a further alternative, the detuning device 70 is not provided with the oscillator mirror but at another position of the optical path in the Ti-sapphire laser.

The adjusting device 50 and the detuning device 70 are illustrated as being connected with the resonator cavity 10 and the pulse source device 20, respectively. According to alternative embodiments of the invention, both components 50, 70 can be provided at one of the resonator cavity 10 and the pulse source device 20. It is even possible to implement both functions of setting a predetermined detuning ratio between the source comb spacing and the cavity mode spacing and changing the source comb frequencies and/or cavity mode frequencies by one single adjusting and detuning device. According to a further alternative, the adjusting device 50 can be provided at the pulse source device 20, while the detuning device 70 can be provided at the resonator cavity 10.

The evaluation device 80 is adapted for resorting detector signals obtained from the detector device 40. Typically, the evaluation device 80 comprises a computer circuit, which processes the detector signals. Optionally, the evaluation device 80 is further adapted for extracting the spectroscopic parameters of the sample from the detector signals as outlined below. The control device 90 comprises a control circuit and a display 91 being adapted for displaying current operation conductions of the spectroscopic device 100 and/or spectroscopic parameters obtained with the evaluation device 80. The control device 90 is adapted for controlling in particular the adjusting device 50 (see arrow). Both components 80, 90 can be integrated in a common circuit.

Operation of the spectroscopic device 100 according to FIG. 1 comprises the following procedural steps. Firstly, a predetermined detuning ratio is set with the detuning device 70. As an example, a detuning ratio of m/n=100/101 is set. Subsequently, the spectroscopic measurement starts with a first cycle of adjusting the cavity length L with the adjusting device 50 and measuring the spectral distribution of the transmitted light according to the current cavity length L. Due to the detuning ratio r, only each 100 th cavity mode frequency is transmitted to the spectral disperser device 30 and detected with spectral resolution with the detector device 40.

A step-wise implementation of scanning the transmitted frequencies includes the following steps. With the first adjustment of the cavity length L, light with corresponding transmitted frequencies is collected and a first data set of detector signals is provided with the detector device 40. Subsequently, the resonator length L is changed by e.g. about 0.5 nm, at most 6 nm (this example refers to light wavelength of about 1 μm, a resonant cavity finesse of 1000 and m=100). Accordingly, intensities of different transmitted frequencies can be detected with spectral resolution. The steps of adjusting the cavity length L and detecting the corresponding spectral distribution of transmitted light are repeated until a predetermined spectral range to be investigated has been scanned by the transmitted mode frequencies. As a result, a plurality of e.g. 100 data sets are obtained with the detector device 40. Subsequently, the detector signals are resorted by the evaluation device 80 and provided as an output signal to the control device 90. With the control device 90, absorption and/or dispersion spectra are calculated as outlined below with reference to FIG. 3. Alternatively, the adjusting step can be implemented continuously, while the intensities of the transmitted frequencies are detected and the detector signals are resorted.

According to FIG. 1, the spectral distributions of transmitted light including different transmitted comb frequencies are detected step by step according to the sequence of adjustment and detection cycles. Accordingly, the groups of transmitted comb frequencies are separated in time. While this technique with a step-wise implementation may require a large amount of time, an alternative embodiment may be preferred, wherein the groups of transmitted comb frequencies are additionally separated in space. This alternative embodiment is schematically illustrated in FIGS. 2 and 3A.

According to FIG. 2, the spectroscopic device 100 comprises the components 10, 20, 30, 40, 50, 70, 80 and 90 as described above with reference to FIG. 1. Additionally, the spectroscopic device 100 is equipped with a deflecting device 60. The deflecting device 60 comprises a tilting mirror 61, which is arranged for directing transmitted light coupled out of the resonator cavity 10 to different portions of the spectral disperser device 30. The spectral disperser device 30 is arranged for spectrally resolving the transmitted light in a direction perpendicular to the scanning direction of the tilting mirror 61. The control device 90 is adapted for controlling both the adjusting device 50 and the deflecting device 60 (see arrows).

Figure 3:
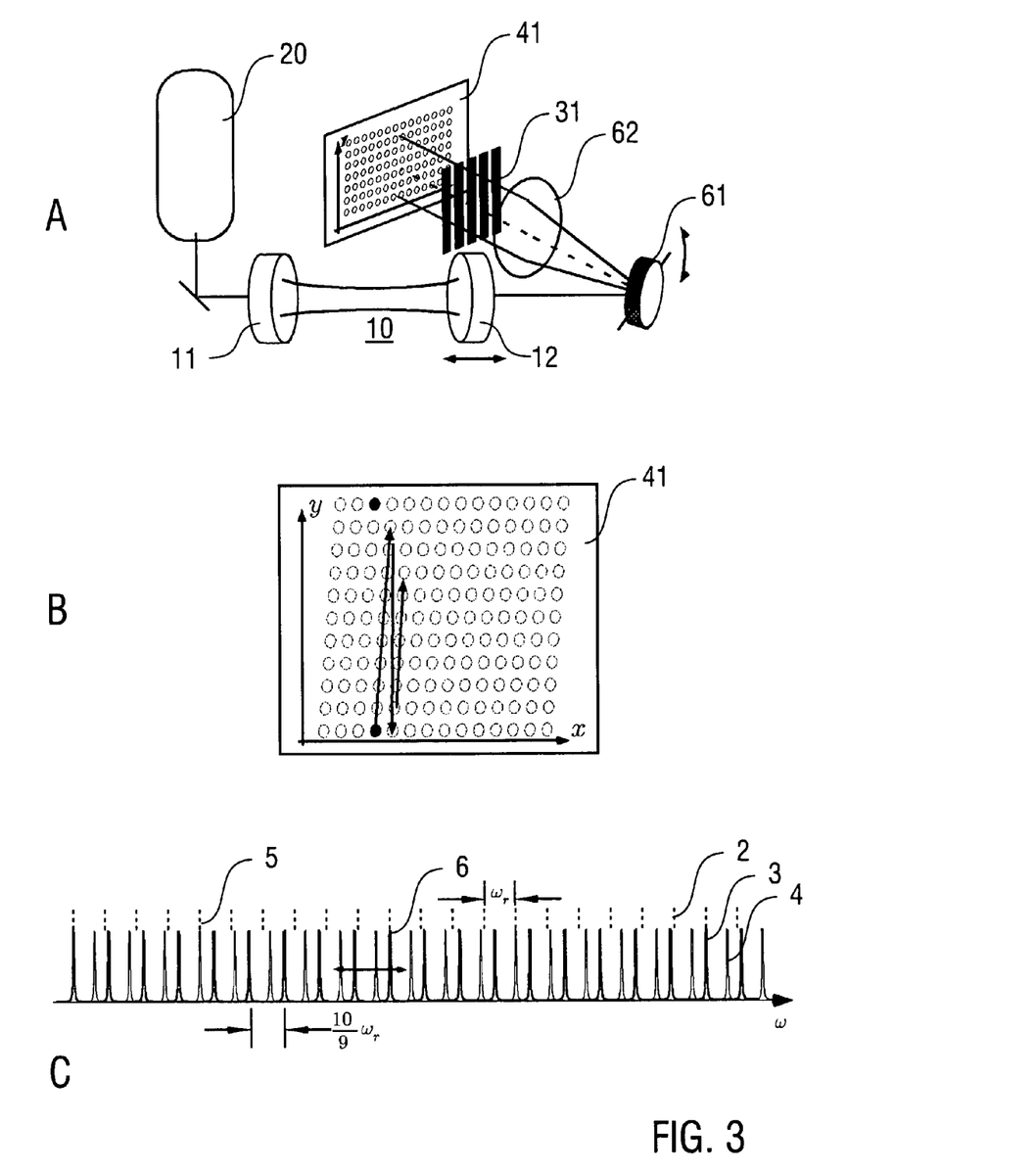
FIG. 3: further details of the second embodiment of the invention.

The adjusting device 50 and the tilting mirror 61 are synchronized. The rotation frequency of the tilting mirror 61 is matched to the duty cycle of the adjusting device 50. During scanning the cavity length L through a predetermined range, the tilting mirror 61 is tilted by an angle covering the spectral disperser device 30. While the transmitted comb frequencies coupled out of the resonator cavity 10 are varied within a predetermined spectral range, spectral distributions with different transmitted comb frequencies are deflected to different portions of the spectral disperser device and correspondingly to different portions of a sensitive area of the detector device 40. The detector device 40 comprises e.g. a 1000×1200 pixel CCD camera (WinCAM-D1 M4, manufacturer: gentec Electro-Optics, Canada) with a pixel size of 5 μm. Further details of operating the spectroscopic device 100 are described in the following with reference to FIGS. 3 and 4. FIG. 3A schematically illustrates a perspective view of components of the spectroscopic device 100 with the pulse source device 20, the resonator cavity 10, the tilting mirror 61, an imaging optic 62, a grating 31 of the spectral disperser device and a CCD-sensor 41 of the detector device. The components 80 and 90 are not shown in FIG. 3A. The x- and y-directions of the sensitive area of the CCD-sensor 41 correspond to the spectral resolution direction of the grating 31 and the scanning direction of the tilting mirror 61, resp.

The pulse source device 20 is a femtosecond laser the pulses of which are sent to the resonator cavity 10. The resonator cavity 10 is a Fabry Perot interferometer. One of the mirrors (scanning mirror) of the resonator cavity 10 is adapted for scanning the cavity length. The transmitted light is sent via the tilting mirror 61 to the spectral disperser device. The tilting mirror 61 is tilted synchronously to the scanning mirror to map the transmission spectrum of the resonator cavity 10 as a function of the cavity length to the y-direction of the CCD-sensor 41.

FIG. 3B schematically illustrates the pattern on a screen behind the grating 31 as sensed by the CCD-sensor 41. The transmitted light creates illuminated spots each corresponding to one of the transmitted comb frequencies. According to a current orientation of the tilting mirror 61, a certain group of transmitted frequencies is coupled out of the resonator cavity and spectrally resolved (x-direction). With rotating the tilting mirror 61 and synchronous changing the cavity length, another group of transmitted frequencies is coupled out of the resonator cavity and imaged to another line (displaced in y-direction). In FIG. 3B, arrows mark the order of the transmitted frequency comb modes (index increasing by one from spot to spot along the arrows).

FIG. 3C further illustrates the creation of the groups of transmitted frequencies. The source frequency comb 2 is shown with dotted lines, while the cavity mode frequency combs 3, 4 (thick, thin lines) are exemplary shown for two different cavity lengths. According to the cavity mode frequency combs 3, 4, the relative positions of the source and cavity mode frequencies are changed and the transmission function of the resonator cavity is shifted. The resonator cavity is detuned to the source comb (m=10, n=9) to provide a vernier for the frequency comb, which is shifted as the cavity length changes. Frequency components 5, 6 mark transmitted modes for two positions of the vernier wherein different source frequencies are transmitted each creating a corresponding spot sensed by the CCD-sensor 41.

In the inventive scheme (see e.g. FIG. 3A), the high resolution, high ambiguity part of the spectrometer and the sensitivity enhancing resonator are combined into one device. The high finesse resonator 10 that takes the sample (absorber) to be detected, is slightly detuned in length, so that the round trip frequency for a pulse in the cavity is about m/n-th of the driving frequency combs repetition frequency ($f_r \approx 1$ GHz). Although the detuning is not well defined, a fixed detuning ratio is assumed here for clarity of the argument.

If the two scales (FIG. 3C) are lined up, every m-th mode from the source frequency comb with frequency $\omega_n = \omega_{CE} + n\omega_r$, $\omega_{CE}$ being the carrier envelope offset frequency and $\omega_r = 2\pi f_r$ the repetition frequency of the pulse source device 20, will be resonant and, provided the finesse of the resonator is high enough (i.e. larger than n), the other modes will be strongly suppressed. Then the frequency comb that is transmitted through the resonator cavity 10 has a spacing of about m×1 GHz, so that for sufficiently large m it can easily be resolved with a very simple grating spectrograph. As the length of the resonator is now tuned, the vernier primarily shifts, bringing the next set of m×1 GHz spaced comb modes into resonance. After scanning the resonator length by one wavelength (i.e. one free spectral range), m groups of m×1 GHz combs have passed by and the situation is as in the beginning, the initial group is transmitted. The only difference is that the spacing of the vernier has slightly changed due to the change in resonator length.

The tilting mirror 61 rotates synchronized with the scanning resonator to streak the light transmitted through the resonator cavity 10 along the axis (y-direction) that is perpendicular to the grating dispersion (x-direction). The 2-dimensional CCD-sensor 41 is (also synchronized to the scanning) exposed to the output of the spectrometer grating 31. This results in the 2-dimensional array of spots on the CCD-sensor 41 that can uniquely be ordered into a single frequency axis as shown in FIG. 3B (arrows). The precise ratio of the vernier (i.e. if it is 60/59th or 59/58th) can easily be determined if there is some structure in the transmission spectrum. This pattern will repeat itself as the resonator is tuned and this period (in spots) gives the correct ratio.

The spot pattern repeats itself after m spots in the scanning (y) direction. For the spots to be clearly separable, it is required that the distance between two maxima is e.g. 5 pixels and therefore the product $5m = p_y$, where $p_y$ is the number of pixels in y direction on the CCD-sensor 41. The largest allowable m (i.e. smallest detuning) is determined by the resonator finesse. This quantity has to be two to three times larger than m. The resolution of the grating spectrometer then has to be better (e.g. a factor of two or three) than $f_r m$. The spectral bandpass, i.e. the range that can be monitored simultaneously is given by (again assuming a spot separation in x-direction of 5 pixels, which requires a careful design of the spectrometer geometry) $f_r m p_x/5$, $p_x$ being the number of pixels on the CCD in x direction. By fine adjustment of the detuning, the spot spacing in one direction can be increased while decreasing it in the other direction proportionally.

Resorting the spot pattern (detector signals) of the CCD-sensor 41 according to the scheme of FIG. 3B yields an output signal of the detector device representing the collected spectral distributions of the transmitted light. The output signal comprises the detector signals in an order of a frequency (or wavelength) axis. Subsequently, at least one spectroscopic parameter of the sample is extracted from the output signal. The at least one spectroscopic parameter (in particular absorption and/or dispersion spectra) is obtained from the brightness, shape and position of the spots as follows.

The output signal that is observed on the CCD-sensor 41, is evaluated on the basis of a transmission model describing the transmission of the resonator cavity 10 as a function of frequency (x-axis on the CCD) and resonator length (y-axis on the CCD). As the individual comb modes can be well isolated from each other on the CCD image, the transmission spectrum can be approximated in the vicinity of a spot with index in row k and column l (start counting from an initial spot, e.g. spot (0, 0), belonging to frequency $\omega_n$) belonging to the frequency $\omega_{k,l} = \omega_{n+k+ml}$ as follows:

$$I_{k,l}(x, y) = \frac{T^2 \delta(x - \omega_{k,l})}{1 + r(\omega_{k,l})^2 - 2r(\omega_{k,l})\cos(\phi(y, \omega_{k,l}))} \quad (1)$$

where r is the round trip amplitude loss factor $r(\omega) = \sqrt{1 - A(\omega)}(1-T)$, with T being the resonator mirror transmission and $A(\omega)$ the absorption of the medium inside the cavity per round trip. $\phi(\omega, y) = \psi(\omega, y) + y\omega/c$ is the round trip phase shift, with c the speed of light in vacuum and $\psi(\phi, y)$ the phase shift of the wave of frequency $\omega$ after one round trip in addition to the vacuum phase shift due to dispersion of the mirrors and the medium. $\delta$ denoted the Dirac distribution. If the dispersive media in the resonator cavity 10 all have a fixed optical path length (like having the medium in a cell within the resonator) or a refractive index very close to unity, the dependence of $\psi$ on the length y can be neglected. The pattern (equation 1) is convoluted with the point spread function of the spectral disperser device to yield the real spot pattern. The model (1) is valid as long as the spot belonging to one resonator mode drops to zero sufficiently fast so that it doesn't overlap significantly with adjacent spots.

The response function may be fit to each spot (k, l) in the image to obtain both $A(\omega_{k,l})$ and $\psi(\omega_{k,l})$ up to multiples of $2\pi$, provided y can be calibrated absolutely to the resonator length L. This is usually difficult however a scaling $y \rightarrow L + L0$ may be obtained quite easily: because $\omega_{k,l}$ and $\omega_{k+m,l-1}$ represent the same frequency, the phase shift difference between the two spots needs to be $2\pi$ and therefore the length corresponding to $y_{k+m,l-1} - y_{k,l} \rightarrow 2\pi c/\omega_{k,l}$, where $y_{k,l}$ shall represent the y-position of the maximum of the peak with the corresponding index (k,l) on the CCD-sensor 41 and it was assumed that the refractive index in the medium between the mirrors is indeed one. Using this relative length calibration, one may determine $\psi$ up to a constant.

Because of the characteristics of the piezo-electric transducer tube 51 and because acoustic noise is coupled to the system, the length scan is not perfectly linear. Nevertheless, because the scan position is the same for any spot with the same y-value, common patterns appearing in all the columns the same way, can be identified and filtered away to some degree, when using an appropriate linear filter. Of course, this procedure will also reject real structure that by accident has the same property. However, such a case can be tested for by changing the resonator detuning, which in turn will make the real structure reappear.

Figure 4:
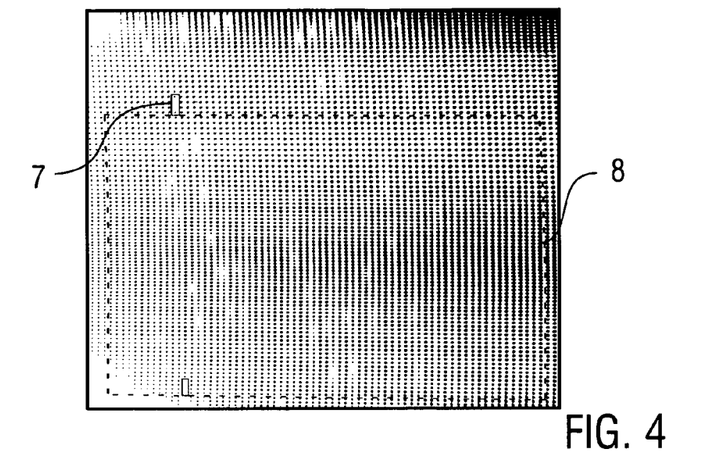
FIGS. 4 and 5: experimental results obtained with the spectroscopic analysis method of the invention.
Figure 5:
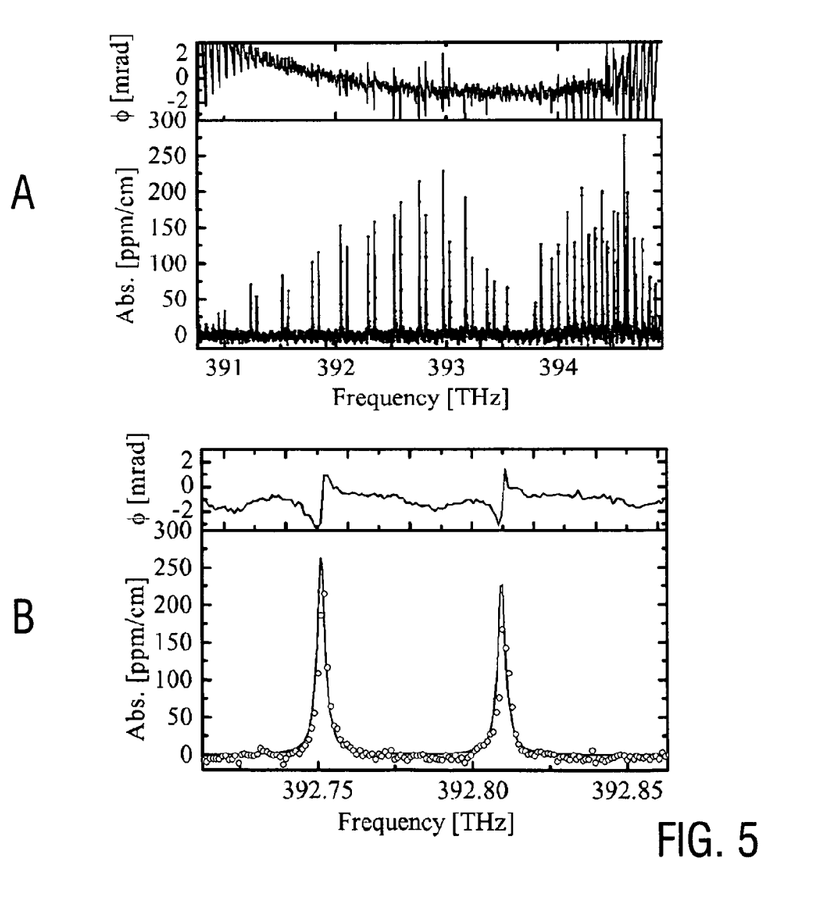

In the following, results measured with the technique of the invention are described with reference to FIGS. 4 and 5. Raw data in the wavelength range from 760 to 770 nm with air inside the resonator cavity 10 was obtained in the way described above and is shown in FIG. 4. FIG. 4 is printed as a negative for clarity reasons, i.e. dark spots represent illumination intensities, while bright spots represent absorptions. The horizontal axis is the dispersion axis of the grating and the vertical axis is the scan axis. This image was exposed for 9 ms, the time for one scan. The resonator cavity 10 has a finesse of a little less than $1000\pi$ and a free spectral range of about 69/68 fr. This corresponds to a resonator lifetime of about 1 μs so for the model (1) to be correct it is necessary to scan the resonator slower than 1 GHz/$1000\pi$=300 kHz in one lifetime or one free spectral range in 3 ms, which is fulfilled by the above parameters. Of course the scan also needs to be slow enough in order to provide a sufficient amount of photons per spot. Bright spot regions are clearly observed in FIG. 4. These are due to absorption lines in the A-band of $O_2$. The period in the pattern in vertical direction identifies the detuning to 69/68$^{th}$. Boxes 7 exemplaries one pattern that was identified, while box 8 marks a unique data set.

After acquisition, the period of the absorption pattern (A-band of $O_2$) was used to identify the detuning of the resonator to be 69/68. To obtain brightness values for each spot, a 2-d Gaussian was fit to the spot and the volume under it was used as a brightness value. This is a good approximation to the model (1), as the width of the transmission fringes are always small compared to the point spread function of the spectrometer. Because this is the case, the volume was related to the Airy (1) area to obtain an intra cavity absorption value.

FIG. 5A shows absorption and dispersion spectra obtained like this. FIG. 5B is a zoom into the data. When comparing the absorption spectrum (lower panel in both figures) to the HITRAN database (see L. S. e. a. Rothman in "J. Quant. Spect. Rad. Trans." vol. 96, 2005, p. 139), by identifying the position of one peak only, the two spectra perfectly agree in frequency, amplitude and line widths. The only free parameter in the measurement was a global frequency offset, as the carrier envelope offset frequency $\omega_{CE}$ was not measured during this experiment. If both the offset frequency $\omega_{CE}$ and the repetition rate were referenced to a frequency standard and the mode number of one of the spots were identified e.g. using a single frequency laser with approximately known frequency, this free parameter can also be fixed.

One essential advantage of the method is to provide both amplitude and phase information about the sample. The phase sensitivity with the illustrated implementation in not specifically high, as the streak speed was chosen to get the largest possible number of spots onto the camera instead of resolving the Airy pattern. Also to obtain the highest phase sensitivity, the scan should be made as linear as possible. Yet by filtering common patterns that appear in the different columns of the spot pattern, and thereby partly eliminating erroneous phases that result from a miscalibrated length, the phase information could be extracted, as shown in the upper panels of FIGS. 5A and B. It shows positive group velocity dispersion (positive curvature) as a function of frequency, as expected from the dielectric mirror of the resonator that were used at the blue end of the mirrors reflectance band. Also dispersive phase evolutions are exhibited for crossing a resonance in $O_2$.

If a noise source (limiting the phase and amplitude sensitivity) is caused by an acoustic noise in the resonator cavity rendering the length scan to be nonlinear and leading to varying vertical positions and brightness of the observed spot pattern, these variations can be corrected for using an appropriate linear filter that removes common patterns in the different spot columns. In an alternative version, this error source can be eliminated by locking the resonator cavity to a stable and scanable optical reference (e.g. a diode laser, offset locked to the frequency comb) and scanning this reference.

The features of the invention disclosed in the above description, the drawings and the claims can be of significance both individually as well as in combination for the realization of the invention it its various embodiments.

While the invention has been described in detail and with reference to specific embodiments thereof, it will be apparent to one skilled in the art that various changes and modifications can be made therein without departing from the spirit and scope thereof.

The invention claimed is:

1. A method of spectroscopic analysis of a sample, comprising:
    arranging the sample in a resonator cavity being capable for transmitting a plurality of cavity mode frequencies with a cavity mode frequency spacing;
    coupling pulsed source light into the resonator cavity, the source light including source comb frequencies with a source frequency spacing;
    coupling pulsed transmitted light out of the resonator cavity; and
    spectrally resolved detecting the transmitted light with a detector device,
    wherein the cavity mode frequency spacing and the source frequency spacing are detuned relative to each other, so that the transmitted light includes transmitted comb frequencies with a transmitted frequency spacing larger than the source frequency spacing, and
    the spectrally resolved detecting step includes collecting spectral distributions of the transmitted light in dependence on relative positions of the cavity mode frequencies and the source comb frequencies, the cavity mode frequencies and the source comb frequencies being varied relative to each other, so that the transmitted comb frequencies are varied within a predetermined spectral range of interest, and the spectral distributions of the transmitted light are collected such that different transmitted comb frequencies within the spectral range of interest are individually resolved.

2. The method according to claim 1, wherein the transmitted comb frequencies corresponding to different relative positions of the cavity mode frequencies and the source comb frequencies are separated in time, and further comprising:
    adjusting the relative position of the cavity mode frequencies and the source comb frequencies;
    detecting the spectral distribution of the transmitted light corresponding to the adjusted relative position; and
    repeating the adjusting and detecting steps until the transmitted comb frequencies have been varied through the whole spectral range of interest.

3. The method according to claim 2, wherein the relative position of the cavity mode frequencies and the source comb frequencies is continuously varied while the spectral distributions of the transmitted source comb frequencies are recorded as a function of time.

4. The method according to claim 2, wherein the adjusting and detecting steps are repeated so that the transmitted comb frequencies are multiple varied through the spectral range of interest.

5. The method according to claim 4, wherein the transmitted source comb frequencies transmitted at different relative positions of the cavity mode frequencies and the source comb frequencies are additionally separated in space, and further comprising:

deflecting the transmitted light such that the different transmitted comb frequencies are directed along different propagation directions to the detector device.

6. The method according to claim 5,
the adjusting step including continuously frequency shifting at least one of the cavity mode frequencies and the source comb frequencies such that the transmitted comb frequencies are varied through the whole spectral range of interest, and
synchronizing the deflecting and detecting steps with the frequency shifting.

7. The method according to claim 5, wherein the different transmitted comb frequencies are detected at different portions of a sensitive area of the detector device.

8. The method according to claim 1, wherein the detector device includes a two-dimensional CCD sensor detecting the transmitted light.

9. The method according to wherein the relative positions of the cavity mode frequencies and the source comb frequencies are varied by varying an optical path length of at least one of a pulse source device and the resonator cavity or by varying an injection intensity of the pulse source device.

10. The method according to claim 9, wherein the optical path length is varied by varying one of a resonator length of the pulse source device and a cavity length of the resonator cavity, respectively.

11. The method according to claim 1, wherein the source comb spacing and the cavity mode spacing are detuned relative to each other by setting at least one of the source comb spacing and the resonant cavity mode spacing.

12. The method according to at least one of the foregoing claim 1, wherein the source comb spacing and the cavity mode spacing are detuned such that the source frequency spacing and the cavity mode frequency spacing have a predetermined detuning ratio selected in dependence on a resolution of at least one of the resonator cavity, a spectral disperser device and the detector device.

13. The method according to claim 1, further comprising providing an output signal of the detector device by resorting detector signals corresponding to the collected spectral distributions of the transmitted light.

14. The method according to claim 13, further comprising extracting at least one spectroscopic parameter of the sample from the output signal of the detector device.

15. The method according to claim 13, further comprising extracting at least one of dispersion and absorption spectra of the sample from the output signal of the detector device.

16. The method according to at least one of the foregoing claim 1, wherein the spectroscopic analysis of the sample comprises at least one of
linear absorption spectroscopy, and
sub-Doppler non-linear spectroscopy, including saturation spectroscopy, optical pumping spectroscopy and multiphoton spectroscopy.

17. A spectroscopic device for spectroscopic analysis of a sample, comprising:
a resonator cavity adapted for accommodating the sample, the resonator cavity being capable of transmitting a plurality of cavity mode frequencies with a cavity mode frequency spacing;
a pulse source device adapted for generating pulsed source light and for coupling the source light into the resonator cavity, the source light including source comb frequencies with a source frequency spacing;
a spectral disperser device adapted for spectrally resolving the transmitted light coupled out of the resonator cavity;
a detector device adapted for detecting the spectrally resolved transmitted light,
the pulse source device and the resonator cavity being adapted for providing the cavity mode frequency spacing and the source frequency spacing detuned relative to each other, so that the transmitted light includes transmitted comb frequencies with a transmitted frequency spacing larger than the source frequency spacing; and
an adjusting device adapted for adjusting at least one of the cavity mode frequencies and the source comb frequencies relative to each other, so that the transmitted comb frequencies are set within a predetermined spectral range of interest,
the spectral disperser device and the detector device being adapted for collecting spectral distributions of the transmitted light in dependence on relative positions of the cavity mode frequencies and the source comb frequencies.

18. The spectroscopic device according to claim 17,
the adjusting device being adapted for step-wise adjusting relative positions of the cavity mode frequencies and the source comb frequencies, and
the detector device being adapted for step-wise detecting the spectral distribution of the transmitted light corresponding to the adjusted relative positions.

19. The spectroscopic device according to claim 18, wherein the detector device has a sensitive area, different portions of which being adapted for collecting the spectral distributions of the transmitted light corresponding to the different transmitted comb frequencies.

20. The spectroscopic device according to claim 19, the deflecting device being adapted for deflecting the transmitted light such that the different transmitted comb frequencies are directed to the different portions of the sensitive area of the detector device.

21. The spectroscopic device according to claim 17, wherein
the adjusting device is adapted for continuously shifting the at least one of the cavity mode frequencies and the source comb frequencies such that the transmitted comb frequencies are varied through the whole spectral range of interest.

22. The spectroscopic device according to claim 17, further comprising
a deflecting device adapted for separating different transmitted comb frequencies in space.

23. The spectroscopic device according to claim 17, wherein the detector device includes a two-dimensional CCD sensor.

24. The spectroscopic device according to claim 17, wherein the adjusting device is adapted for periodically varying the transmitted comb frequencies through the whole spectral range of interest.

25. The spectroscopic device according to claim 17, further comprising
a detuning device adapted for detuning the cavity mode spacing and the source comb spacing relative to each other by setting at least one of the source comb frequencies and the resonant cavity mode frequencies.

26. The spectroscopic device according to claim 17, wherein the adjusting device and/or a detuning device is adapted for varying an optical path length of the pulse source device or the resonant cavity or for varying an injection intensity of the pulse source device.

27. The spectroscopic device according to claim 26, wherein the adjusting device and/or the detuning device is adapted for varying at least one of a resonator length of the pulse source device and a cavity length of the resonant cavity.

28. The spectroscopic device according to claim 17, further comprising
an evaluation device adapted for resorting detector signals corresponding to each of the collected spectral distributions of the transmitted light and for providing an output signal of the detector device.

29. The spectroscopic device according to claim 28, wherein
the evaluation device is adapted for extracting at least one spectroscopic parameter of the sample from the output signal of the detector device.

30. The spectroscopic device according to claim 28, wherein
the evaluation device is adapted for extracting at least one of dispersion and absorption spectra of the sample from the output signal of the detector device.

31. The spectroscopic device according to claim 17, wherein the pulse source device includes at least one of a laser oscillator and a device adapted for a non-linear frequency conversion of light pulses.

* * * * *

UNITED STATES PATENT AND TRADEMARK OFFICE
CERTIFICATE OF CORRECTION

PATENT NO. : 8,120,773 B2
APPLICATION NO. : 12/520577
DATED : February 21, 2012
INVENTOR(S) : Gohle et al.

It is certified that error appears in the above-identified patent and that said Letters Patent is hereby corrected as shown below:

On the face page of the patent, under Item (73) "Assignee," the Assignee name reading (Max-Planck-Gesellshaft zur Foerderung der Wissenschaften, E.V.), should read --Max-Planck-Gesellschaft zur Foerderung der Wissenschaften, e.V.--.

On the face page of the patent, under Item (87) "PCT Pub. No.," the PCT Publication Number reading (WO2007/077572), should read --WO2008/077572--.

Signed and Sealed this
Fifteenth Day of May, 2012

David J. Kappos
*Director of the United States Patent and Trademark Office*